(12) United States Patent
Ichiyama

(10) Patent No.: US 6,211,592 B1
(45) Date of Patent: Apr. 3, 2001

(54) MOTOR FOR DRIVING STORAGE DISKS

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/535,960

(22) Filed: Mar. 27, 2000

(30) Foreign Application Priority Data

Mar. 29, 1999 (JP) .................................. 11-087228
Mar. 9, 2000 (JP) .................................. 00-064454

(51) Int. Cl.⁷ ............................ H02K 5/16; H02K 21/22; F16C 35/10; F16C 32/06
(52) U.S. Cl. ...................... 310/90; 310/67 R; 384/100; 384/107; 384/112; 384/113; 360/98.08; 360/99.08; 360/99.04
(58) Field of Search ................... 310/67 R, 90; 360/98.07, 99.04, 98.06, 99.06; 384/100, 107–109, 111–115, 134, 132, 117–120

(56) References Cited

U.S. PATENT DOCUMENTS

| | | | |
|---|---|---|---|
| 4,998,033 | * | 3/1991 | Hisabe et al. ............... 310/67 R |
| 5,052,822 | | 10/1991 | Van Beek . |
| 5,193,084 | * | 3/1993 | Christiaens ................ 360/99.08 |
| 5,358,339 | * | 10/1994 | Konno et al. ............... 384/107 |
| 5,504,637 | | 4/1996 | Asada et al. . |
| 5,543,984 | | 8/1996 | Itoh . |
| 5,810,479 | | 9/1998 | Miyasaka et al. . |
| 6,033,118 | * | 3/2000 | Asai et al. ................. 384/115 |
| 6,074,098 | * | 6/2000 | Asai et al. ................. 384/112 |

FOREIGN PATENT DOCUMENTS

| | | |
|---|---|---|
| 6-221324 | 8/1994 | (JP) . |
| 6-284631 | 10/1994 | (JP) . |
| 8-331796 | 12/1996 | (JP) . |
| 9-46938 | 2/1997 | (JP) . |
| 9-166145 | 6/1997 | (JP) . |
| 10-9250 | 1/1998 | (JP) . |

* cited by examiner

*Primary Examiner*—Tran Nguyen
(74) *Attorney, Agent, or Firm*—Shinjyu Intellectual Property Firm

(57) ABSTRACT

A storage-disk drive motor miniaturized and made thinner by eliminating the conventional thrust plate for the rotor-hub thrust dynamic pressure-generating bearing, and by employing only one rotor-hub radial dynamic pressure-generating bearing. The motor is inner-rotor type wherein the rotor magnet is radially inward of the stator. To maintain thrust bearing rigidity absent the thrust plate, the stator/bracket and the rotor magnet are configured such that magnetism between them imparts a energizing force to the rotor hub biasing it axially, and at the same time, specially striated dynamic-pressure-generating grooves in the rotor hub bearings generate thrust to balance this energizing force. Due to the special rotor-hub bearing configuration, the means for venting the lubricant retained in the bearing micro-gaps are modified accordingly.

12 Claims, 4 Drawing Sheets

MOTOR FOR DRIVING STORAGE DISKS

BACKGROUND OF THE INVENTION

1. Technical Field

The present invention relates to storage-disk drive motors for spinning for example hard disks and like storage disks, wherein the motors have dynamic-pressure bearings for supporting the storage disk rotation. In particular the present invention relates to storage-disk drive motors having dynamic-pressure bearings for supporting rotation of storage disks of small outside-diameter, such as 1-inch.

2. Description of Related Art

Miniature and thin storage-disk drive motors for driving hard disks and like storage disks are known. Such an example is the motor disclosed in Japanese Laid-Open Patent Application No. 09-46938. This conventional storage-disk drive motor is provided with a bracket, a rotor hub outer-circumferentially carrying a storage disk and supported by a pair of ball bearings so as to be rotatable relative to the bracket; a rotor magnet fixedly fitted to the rotor hub; and a stator disposed so as to radially oppose the rotor magnet.

Nevertheless, in motors thus employing ball bearings to support rotation of the rotor hub, bearing rigidity is largely due to the diameter of the balls used. In driving for example 1-inch outside-diameter storage disks, however, the diameter of the mounting hole formed in the center of the storage disk for mounting it on the rotor hub will only be approximately 6 mm. This not only restrains the dimension of the balls that may be used for the ball bearings to a diameter that leaves rotation of the rotor hub unstable, but also compels miniaturizing the shaft and making other structural parts thin-walled, such that it is difficult to maintain sufficient mechanical strength in the motor.

There are, furthermore, storage-disk drive motors wherein instead of the ball bearings as described above, dynamic-pressure bearings are used for supporting rotation of the rotor hub. Such an example is the motor disclosed in Japanese Laid-Open Patent Application No. 09-166145. This conventional motor has a pair of radial bearings as means that support radial loads; and further a pair of thrust bearings as means that support axial loads. The radial bearings retain a lubricant in a micro-gap defined between the shaft and the inner circumferential surface of a sleeve member that radially opposes the outer circumferential surface of the shaft. Dynamic pressure-generating grooves consisting of herringbone striations are formed on the outer circumferential surface of the shaft so as to generate dynamic pressure in the lubricant during rotation of the rotor hub.

Likewise, the thrust bearings retain a lubricant in a micro-gap defined between a disk-shaped thrust plate fastened to the end of the shaft, and the end face of the sleeve member and the upper face of the thrust cover, which axially oppose the top/bottom faces of the thrust plate. Dynamic pressure-generating grooves consisting of spiral striations formed on the top/bottom faces of the thrust plate generate dynamic pressure in the lubricant during rotation of the rotor hub.

Nevertheless, personal computers using storage-disk drive devices continue to be made smaller and thinner. What is more, storage-disk drive devices have come to be used in compact equipment such as digital cameras. This calls for miniaturizing and making thinner the storage-disk drive motor itself.

Employing dynamic-pressure bearings instead of ball bearings has done away with the effects of the ball diameter, and has made it possible stably to sustain rotation of the rotor hub. With there being a pair of radial bearings, however, it is very difficult to miniaturize the motor and make it thinner overall while maintaining satisfactory assembly precision, and joint strength in the shaft and thrust plate joint.

SUMMARY OF THE INVENTION

An object of the present invention is to provide a smaller, thinner storage-disk drive motor.

An additional object of the invention is to provide a storage-disk drive motor wherein the motor has been miniaturized and made thinner, and that further enables precision driving of storage disks diametrically small in outside diameter.

A yet further object of the invention is to provide a storage-disk drive motor that is of simple and inexpensive construction without using a thrust plate on thrust bearing.

A additional object of the present invention is to provide a storage-disk drive motor that is miniaturized, made thinner, and at the same time is inexpensive and moreover readily manufactured and assembled.

A still further object of the invention is to provide a smaller, thinner storage-disk drive motor that meanwhile has high bearing rigidity.

Another object of the present invention is to provide a storage-disk drive motor that does not have a thrust plate on the thrust bearing, is miniaturized as well as made thinner, and meanwhile is inexpensive, and readily manufactured and assembled.

A still further object of the present invention is to provide a storage-disk drive motor that is minimized as well as thinner without reducing motor reliability and rigidity.

A storage-disk driving motor according to the present invention includes a radial bearing portion and a thrust bearing portion for supporting rotation of the rotor hub, from the outer circumference of which a flange extends such that a storage disk can be mounted thereon. The radial bearing portion is constituted by the inner peripheral surface of a cylindrical through-hole formed in the central portion of the rotor hub, and the outer peripheral surface of the shaft. The thrust bearing portion is constituted between the lower end-face of the rotor hub and the upper face of the bracket. Furthermore, the rotor hub is biased in the axial direction by magnetic force.

The thrust bearing in a storage-disk drive motor of the present invention is formed between lower end-face of rotor hub having the cylindrical through-hole through which the shaft is inserted, and the upper face of the bracket. Thus the conventional thrust plate is unnecessary, and the motor is therefore miniaturized and made thinner.

Furthermore, since a thrust plate is not employed, there is no need for concern that rotational precision will be out of true due to error in precision and insufficient strength of the thrust plate and the shaft joint. This improves productivity in facilitating manufacture as well as assembly of the motors, and at the same time contributes to motor cost reduction.

The foregoing and other objects, features, aspects and advantages of the present invention will become more apparent from the following detailed description in conjunction with the accompanying drawings.

DETAILED DESCRIPTION OF THE PREFERRED EMBODIMENTS

With reference to the drawings, the following explains embodiments of a storage disk drive motor in connection with the present invention; the present invention is not, however, limited to the respective embodiments illustrated below.

Figure 1:
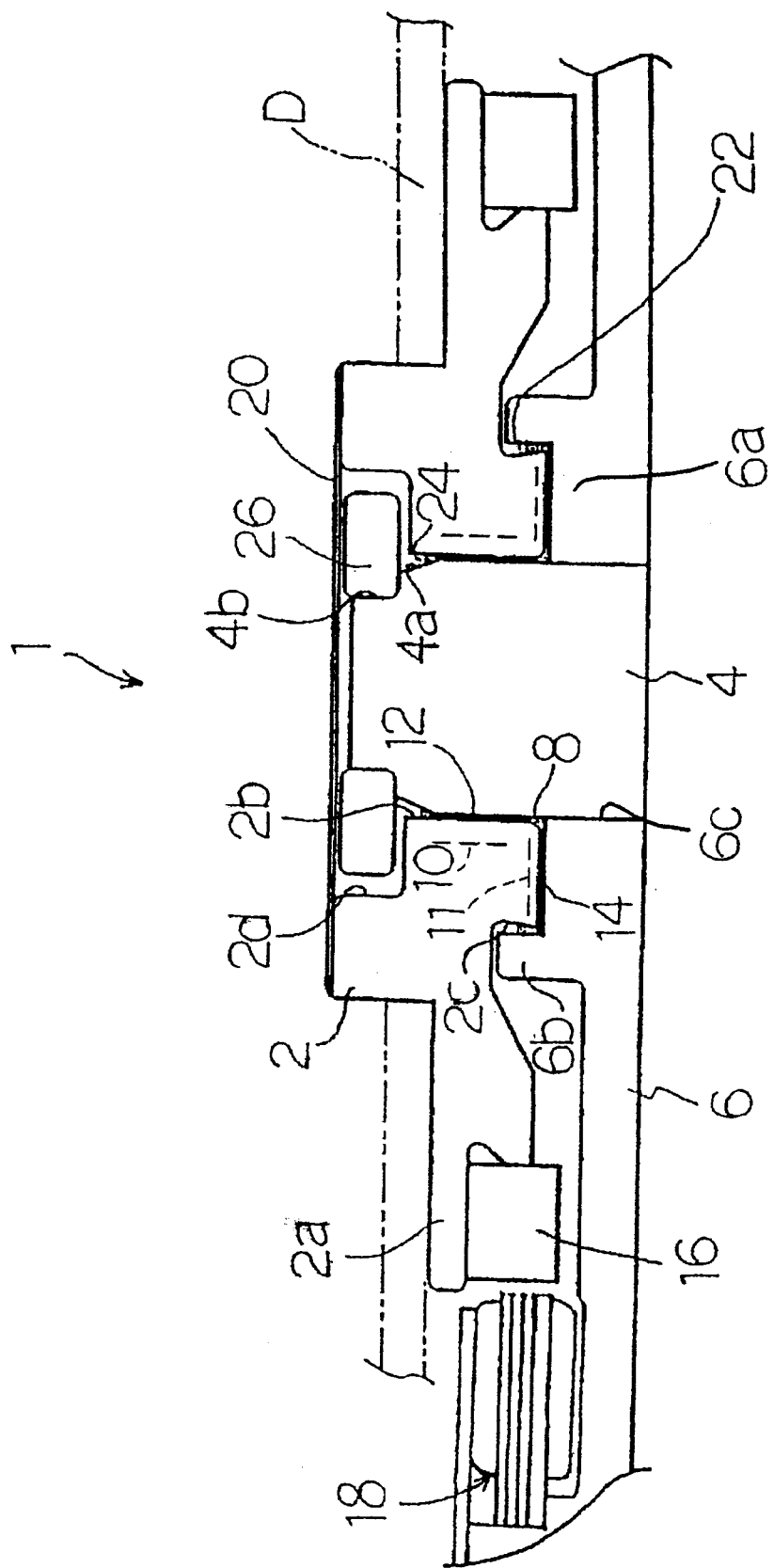
FIG. 1 is a vertical section view schematically illustrating the configurational outline of a storage-disk drive motor in a first embodiment of the present invention.

Referring to FIG. 1, the storage-disk drive motor 1 has a rotor hub 2 and a shaft 4. A flange 2a is provided projecting radially outward from the outer circumference of the rotor hub 2 for carrying a storage disk D, indicated by phantom lines in FIG. 1, such as a hard disk. The shaft 4 is inserted through a cylindrical through-hole 2b that axially bores the rotor hub 2. An end of the shaft 4 is fixedly fitted into an opening 6c of a bracket 6. A lubricant 8 such as oil is continuously retained by capillarity within the micro-gaps formed between the cylindrical through-hole 2b in the rotor hub 2 and he shaft 4, and between the rotor hub 2 and the bracket 6. A radial bearing 12 is formed in between the outer circumferential surface of the shaft 4 and the radially opposing inner peripheral surface of the rotor hub 2, which defines the cylindrical through-hole 2b. By the action of radial dynamic-pressure-generating grooves 10, the radial bearing 12 generates radial load-supporting pressure within the lubricant 8. Likewise, a thrust bearing 14 is formed in between the upper face of the bracket 6 and the axially opposing end face of the rotor hub 2. By the action of thrust dynamic-pressure-generating grooves 11, the thrust bearing 14 generates thrust load-supporting pressure within the lubricant 8. A rotor magnet 16 is fixedly fitted to the lower part of the flange 2a of the rotor hub 2. A stator 18 that radially opposes the rotor magnet 16 through a predetermined radial air gap is mounted to the bracket 6 for rotatively driving the rotor hub 2 cooperatively with the rotor magnet 16.

Figure 2A:
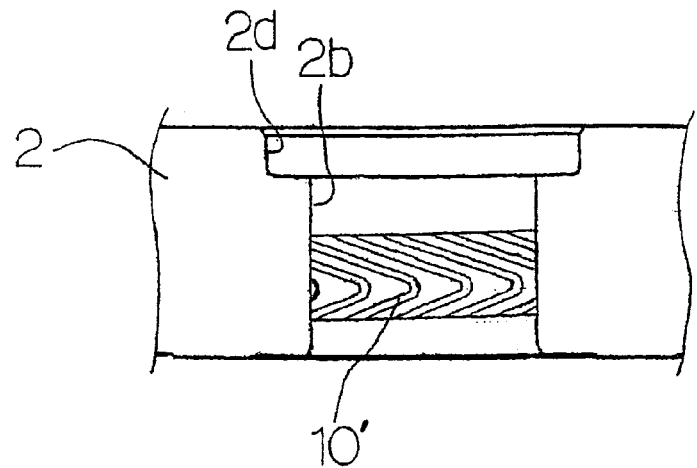
FIG. 2A is a fragmentary section view illustrating an example of dynamic-pressure-generating grooves for the radial bearing portion of the storage-disk drive motor depicted in FIG. 1.

The radial dynamic-pressure-generating grooves 10 of the radial bearing portion 12 may be herringbone striations such as are illustrated for example in FIG. 2A. The herringbone striations 10' are joined with upper- and lower-end spiral striations that are directed oppositely to each other. The upper-end spiral striations are made axially longer compared to the lower-end spiral striations so as to generate dynamic pressure acting in the axial direction toward the thrust bearing 14 during rotation of the rotor hub 2. Likewise, the thrust dynamic-pressure-generating grooves 11 of the thrust bearing portion 14 may be spiral striations such as are illustrated for example in FIG. 2B. The spiral striations 11' are oriented radially inward so as to generate dynamic pressure acting in the radial direction toward the shaft 4, that is, the radial bearing 12.

Figure 2B:
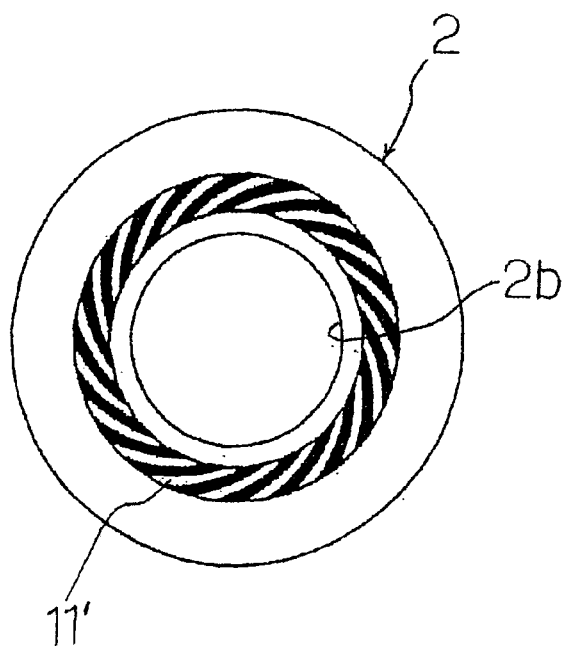
FIG. 2B is a partial plan view illustrating an example of dynamic-pressure-generating grooves for the thrust bearing portion of the storage-disk drive motor depicted in FIG. 1.

The herringbone striations 10' as shown in FIG. 2A being radial dynamic-pressure-generating grooves 10 that act in the axial direction toward the thrust bearing 14, and the spiral striations 11' as shown in FIG. 2B being thrust dynamic-pressure-generating grooves 11 that act in the radial direction toward the radial bearing 12, makes the load-bearing pressure acting on the lubricant 8 during rotation highest near the boundary between the radial bearing portion 12 and the thrust bearing 14. Meanwhile, the pressure continuously drops heading toward the axially outer end of the radial bearing portion 12 and radially outward in the thrust bearing 14. Accordingly, air bubbles within the lubricant migrate successively to the lower-pressure end and open outside the bearings from the bearing ends. Air bubbles therefore do not remain within the lubricant 8, which prevents the lubricating fluid 8 from leaking outside the bearing by expansion of the bubbles due to changes in temperature and air pressure.

Figure 3A:
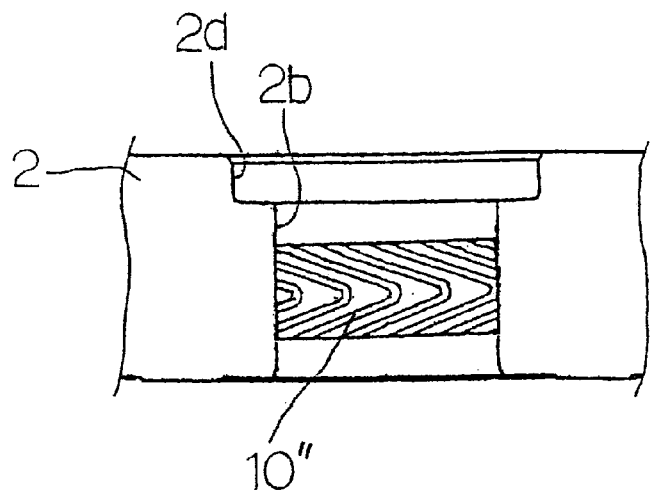
FIG. 3A is a fragmentary section view illustrating another example of dynamic-pressure-generating grooves for the radial bearing portion of the storage-disk drive motor depicted in FIG. 1.
Figure 3B:
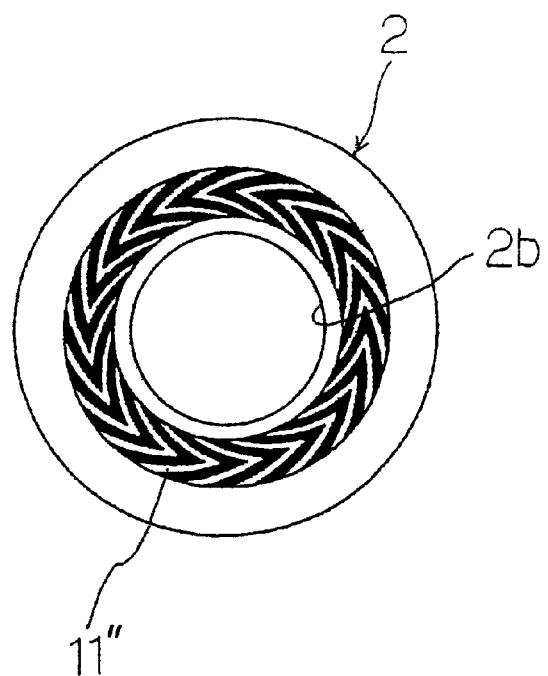
FIG. 3B is a partial plan view illustrating another example of dynamic-pressure-generating grooves for the thrust bearing portion of the storage-disk drive motor depicted in FIG. 1.

Instead of the radial dynamic-pressure-generating grooves 10 and thrust dynamic-pressure-generating grooves 11 shown in FIGS. 2A and 2B, the radial dynamic-pressure-generating grooves 10 of the radial bearing portion 12 can be, as illustrated in FIG. 3A, herringbone striations 10" the upper and lower spiral grooves of which are substantially equal in axial length; and the thrust dynamic-pressure-generating grooves 11 of the thrust bearing portion 14 can be, as illustrated in FIG. 3B, herringbone striations 11" likewise as with the radial bearing portion 12. In addition, either one or both of the herringbone striations 10", 11" of the radial bearing portion 12 and the thrust bearing portion 14 may be herringbone striations of asymmetrical form such that the dynamic pressure that develops act in another bearing direction.

Herein, the load-bearing pressure that acts in the lubricant 8 during rotation of the rotor hub 2 is respectively highest immediate where the respective spiral grooves of the herringbone striations 10", 11" join in the radial bearing portion 12 and the thrust bearing portion 14. The pressure goes low near the boundary between the radial bearing portion 12 and the thrust bearing portion 14. Consequently, air bubbles in the lubricant 8 concentrate immediate the boundary between the radial bearing portion 12 and the thrust bearing portion 14, and therefore there necessarily will be concern for discharging the bubbles outside the bearings.

Figure 4:
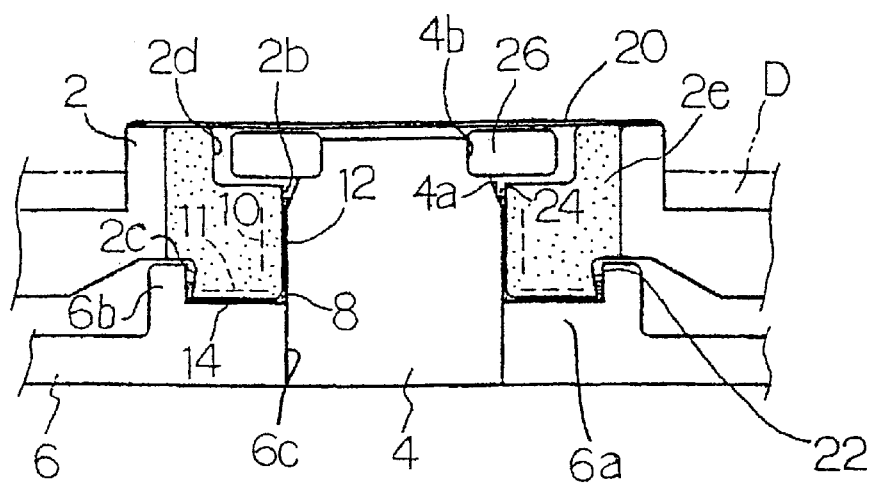
FIG. 4 is a fragmentary section view schematically illustrating principal component configuration of an alternate example of a rotor hub for the storage disk drive motor depicted in FIG. 1.

To address this concern, as shown in FIG. 4 for example, a part of the rotor hub 2 that faces the radial bearing portion 12 and thrust bearing portion 14 is formed by an oil-retaining porous metal member 2e to communicate the bearing portions with the outer air via the holes within the oil-retaining metal. This enables air bubbles that are inward in the lubricant 8 to be discharged outside of the bearings. Examples of porous oil-containing metal stuffs that may be used are materials obtained by pressure-forming and sintering machining-powdered graphite/cast iron flakes, and that are impregnated with a lubricant.

Blanking (blinding) on the oil-retaining porous metal member 2e formed as a part of the rotor hub 2 as in the FIG. 4 example ensures that the dynamic pressure generated will serve effectively as load-supporting pressure. The blanking prevents escape to the bearing portions through the holes within the oil-retaining porous metal member 2e of lubricant 8 in which the action of the dynamic-pressure-generating grooves during rotation of the rotor hub 2 has raised the pressure. Therein, the blanking process is carried out on at least the pressure-generating central portions (largest-pressure-generating parts) of the bearing-facing sections of the oil-retaining porous metal member 2e—the dynamic-pressure-generating portions on which the dynamic-pressure-generating grooves are formed. Because blanking, moreover, does not lower the proportion of holes in the oil-retaining porous metal member 2e overall, sufficient lubricant is retained within the holes of the oil-retaining porous material.

Figure 5:
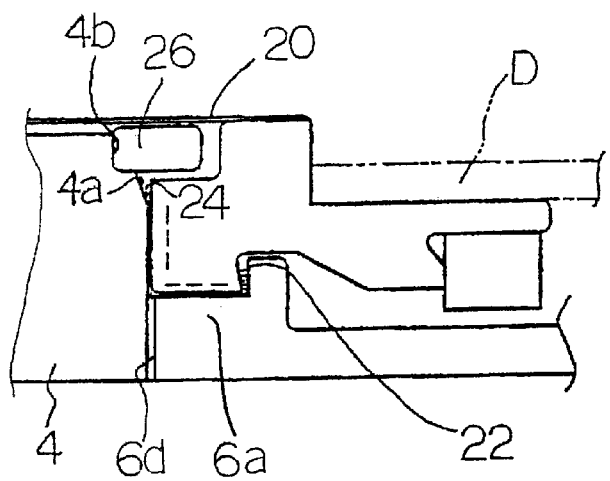
FIG. 5 is a fragmentary section view schematically illustrating principal component configuration of an alternate example of the joint section between the shaft and bracket of the storage disk drive motor depicted in FIG. 1.

Further, as shown in FIG. 5, on a part of the opening 6c in the bracket 6, into which the lower end of the shaft 4 is fixed, a cutout 6d boring the bracket 6 axially is formed, making a through-hole via the joint of the shaft 4 and the bracket 6. This through-hole communicates the bearing portions with the outside air, enabling air bubbles remaining within the lubricant 8 to exhaust outside the bearings.

The opening on the upper part of the cylindrical through-hole 2b in the rotor hub 2 is sealed by a cover 20. The radial bearing portion 12 is liberated to the outside air through small pores (not illustrated) formed in the cover 20, which balances the surface tension at the distal interface of the lubricant 8 on the radial bearing portion 12 side with the air pressure of the outside air. As an alternative to the foregoing construction yet that yields a similar effect, the cover 20 can be formed from a pliant material, wherein the cover 20 will expand/shrink in response to internal/external pressure changes in the motor.

A round boss 6a is formed circumferentially on the part of the bracket 6 into which the lower end of the shaft 4 is fixed. An annular wall 6b is formed on the outer periphery of the upper portion of the boss 6a so as to extend from the upper portion thereof in the axially inward direction. At the lower part of the rotor hub 2 where it continues from the thrust bearing 14, a first surface-tension seal 22 located inside the annular wall 6b is provided. Cooperation between an outer peripheral face 2c of the cylindrical lower end of the rotor hub 2, and the inner peripheral surface of the annular wall 6b sets up the seal structure in the radially outer end of the thrust bearing portion 14.

The outer peripheral face 2c of the cylindrical lower end of the rotor hub 2 slopes axially inward such that the width of the gap defined between the outer peripheral face 2c and the inner peripheral surface of the annular wall 6b expands moderately going axially inward. In the gap thus defined a meniscus that is the interface of the lubricant 8 and the external atmosphere is formed and maintained by the balancing of: the surface tension of the lubricant 8 retained in the thrust bearing portion 14, mutually attracting force due to inter-molecular forces between the molecules of the lubricant 8 and molecules of the members defining the gap, and the air pressure of the external atmosphere. The first surface-tension seal 22 thus formed prevents the lubricant 8 from leaking to the exterior of the bearings.

Likewise, a second surface-tension seal 24 is provided in the axially outward end of the radial bearing portion 12. Cooperation between the inner peripheral face of the cylindrical through-hole 2b and the outer circumferential surface of the shaft 4 sets up the seal structure. The outer circumferential surface of the shaft 4 slopes heading axially away such that the width of the gap defined between the inner circumferential face of the cylindrical through hole 2b and the outer peripheral surface of the shaft 4 expands moderately heading axially away. In the gap thus defined a meniscus is formed and maintained by the balancing of: the surface tension of the lubricant 8 retained in the radial bearing portion 12, mutually attracting force due to inter-molecular forces between the molecules the lubricant 8 and molecules of the members defining the gap, and the air pressure of the external atmosphere. The second surface-tension seal 24 thus formed prevents the lubricant 8 from leaking to the exterior of the bearings.

Evaporation/vaporization may diminish lubricant 8 retained on the part of either the radial bearing portion 12 or the thrust bearing portion 14. The boundary surfaces between the lubricant 8 and the outside air, formed by the first and second surface-tension seals 22 and 24, will then shift, giving rise to a difference in the radius of curvature of the meniscus that will unbalance the action of the air pressure of the outside air on the boundary surfaces. Nevertheless, because the lubricant 8 is retained continuously in between the bearings, it shifts such that the unbalance is eliminated, from the bearing end where more lubricant is retained, to the other bearing end—and to the position wherein the outside air pressure acting on the boundary surfaces in the seals is equalized and balanced.

Accordingly, the lubricant 8 can shift in between the radial bearing portion 12 and the thrust bearing portion 14, which prevents the lubricant retained only in a bearing on one end from running dry prematurely. This maintains stabilized bearing force over the long term. It should be noted that "outside air" as used herein means the atmosphere outside the micro-gaps in the bearings, irrespective internally/externally of the motor 1, and internally/externally of the device in which the motor 1 is used. This meaning is also irrespective of whether the pressure of the outside air is the atmospheric pressure or not.

Furthermore, to prevent occurrence of the so-called oil migration phenomenon, wherein lubricant 8 spreads along the surfaces forming the first and second surface-tension seals 22 and 24 and leaks to the exterior of the bearings, the surfaces forming the first and second surface-tension seals 22 and 24 are coated, and/or the vicinity of the seals is coated with an oil-repellant made for example from a fluorochemical.

Further, an annular cutout 4b is formed in the axially upper end of the shaft 4. A ring-shaped member 26 that projects radially outward from the outer circumferential face of the shaft 4 is fixed to the annular cutout 4b. An annular depression 2d corresponding to the ring-shaped member 26 is formed in the inner circumferential face of the cylindrical through-hole 2b. The meshing of the ring-shaped member 26 and the annular depression 2d forms a collar configuration to keep the shaft 4 from slipping out.

In response to excitation of the stator 8, the rotor hub 2 starts to rotate with respect to the shaft 4 and the bracket 6 according to the foregoing configuration. When the rotor hub 2 begins to rotate: the lubricant 8 retained in the thrust bearing portion 14 develops thrust load-supporting pressure by the action of the thrust dynamic-pressure-generating grooves 11 with the rotation of the rotor hub 2; likewise, the lubricant 8 retained in the radial bearing portion 12 develops radial load-supporting pressure by the action of the radial dynamic-pressure-generating grooves 10 with the rotation of the rotor hub 2.

Therein, the magnetic centers of the rotor magnet 16 and the stator 18 are not coincident and are displaced in the axial direction of the shaft 4. The axial displacement of the magnetic centers is such that by the magnetic attractive force acting between the rotor magnet 16 and the stator 18, the rotor magnet 16 is urged axially downward toward the bracket 6. As a result of the magnetic attractive force between the rotor magnet 16 and the stator 18, the rotor hub 2 is urged toward the bracket 6 by a downward force, which acts against the thrust load-bearing pressure of the thrust bearing portion 14. Consequently, the magnetic attractive force between the rotor magnet 16 and the stator 18 acts as a thrust bearing generating thrust load-bearing pressure. Thus, the magnetic attractive force of the rotor magnet 16 and the stator 18, and the thrust load-bearing pressure generated by the thrust bearing portion 14 are balanced against each other. It should be understood that this magnetic force could be imparted by arranging a magnetic material in the position on the bracket 6 in which it axially opposes the rotor magnet 16. Moreover, the rotor magnet 16 is fitted underneath the disk-carrying flange 2a of the rotor hub 2 wherein the flange 2a serves as a magnetic shield for the rotor magnet 16. This prevents the magnetism of the rotor magnet 16 from having a negative effect on the storage disk D such as might destroy the recorded data.

Herein, if the rotor hub 2 is formed from a nonmagnetic material such as aluminum, a magnetic shield can be formed by interposing a yoke element formed of iron or a like magnetic material between the underside of the storage-disk-carrying flange 2a and the upper surface of the rotor magnet 16.

Further, the configuration of the motor described above is a so-called inner-rotor type structure, wherein the stator 18 is oriented radially inward, with the rotor magnet 16 and the stator 18 that constitute a magnetic circuit of the motor being arranged radially outward of the rotor hub 2. Consequently, space for the magnetic circuit is not confined substantially to the size of the storage disk D fitted on the rotor hub 2. This ensures sufficient space to obtain relatively large rotational torque even wherein the storage disks carried on the rotor hub 2 are of small outside diameter.

In addition, compared with motors having an outer-rotor type configuration that positions the rotor magnet radially outward of the stator, with inner-rotor type motors the outer diametric dimension of the rotating system excluding the storage disk is reduced. Therefore, the burden on the bearings is lessened and the rotation of the rotor hub is kept stable, which is particularly advantageous in the case of miniature motors.

By configuring the storage disk-drive motor 1 in the foregoing manner, the size of the storage disk loaded on the rotor hub 2, even being a one-inch outer diameter storage disk, hardly influences the rotational driving.

One embodiment of a storage disk drive motor in accordance with the present invention has thus been explained, but the present invention is not limited to these such embodiments; various modifications or alterations are possible without deviating from the scope of the present invention.

For instance, in the illustrated embodiment, a motor in which the dynamic-pressure-generating grooves acting on the lubricant in the radial bearing portion and the thrust bearing portion are formed on the rotor hub was given as an example and explained—to which the present invention is not however limited; the invention is of course applicable to a motor in which the dynamic-pressure-generating grooves are formed on the shaft or the bracket.

What is claimed is:

1. A storage disk drive motor comprising:

a rotor hub formed with a flange for circumferentially carrying a storage disk and having an approximately central cylindrical through-hole;

a shaft inserted in the cylindrical through-hole for rotation relative to the rotor hub;

a bracket having an opening wherein a lower end of the shaft is fixedly fitted;

an annular rotor magnet secured to the rotor hub; and a stator radially opposing the rotor magnet through a predetermined air gap;

said shaft along having an outer circumferential surface radially opposing an inner circumferential surface of said cylindrical through-hole, said outer circumferential surface of said shaft and said inner circumferential surface of through-hole are separate by a micro-gap wherein a lubricant is retained, a radial bearing portion therein being configured by dynamic-pressure-generating grooves formed on at least one of the inner circumferential surface of said through-hole and the outer circumferential surface of said shaft, said rotor hub having an axially lower end face axially opposed to an upper surface of said bracket, said axially lower-end face of said hub and said upper face of said bracket are separate by said micro-gap wherein said lubricant is retained, a thrust bearing portion therein being configured by dynamic-pressure-generating grooves formed on at least one of the axially lower end face of said rotor hub and the upper face of said bracket, and said rotor hub being axially biased by magnetic force.

2. A storage disk drive motor as set forth in claim 1, wherein said radial bearing portion is formed on only one of either the inner circumferential surface of said through-hole and the outer circumferential surface of said shaft, and wherein said thrust bearing portion is located adjoining and said radial bearing portion; said lubricant being retained continuously within the micro-gap of said radial bearing portion and the micro-gap of said thrust bearing portion.

3. A storage disk drive motor as set forth in claim 2, wherein:

said bracket has an annular wall formed radially outward of said thrust bearing portion and extending axially away from said bracket, an inner peripheral surface of said annular wall radially opposing through a first narrow gap said rotor hub having an outer circumferential surface and said first narrow gap moderately expanding in width going axially inward, for making a first surface-tension seal wherein a meniscus being an interface of said lubricant retained in said thrust bearing portion and air is formed and maintained in said first narrow gap; and said micro-gap adjacent to an axially upper portion of said radial bearing portion moderately expands in width heading axially away in a second narrow gap for making a second surface-tension seal wherein a meniscus being an interface of said lubricant retained in said radial bearing portion and air is formed and maintained in said second narrow gap.

4. A storage disk drive motor as set forth in claim 1, wherein herringbone striations are formed on said radial bearing portion and said thrust bearing portion as dynamic-pressure-generating grooves.

5. A storage disk drive motor as set forth in claim 4, wherein at least a part of said rotor hub is formed from a porous component.

6. A storage disk drive motor as set forth in claim 4, wherein a boundary portion between said radial bearing portion and said thrust bearing portion is communicated with outside air through a through-hole defined between said lower end of said shaft along its outer circumferential surface and said opening in said bracket along its inner peripheral surface, said through-hole therein extending axially such that said bracket is axially perforated.

7. A storage disk drive motor as set forth in claim 1, wherein:

herringbone striations configured to be axially asymmetric are formed as dynamic-pressure-generating grooves in said radial bearing portion, such that radial load-bearing pressure generated by said herringbone striations acts in an axially downward direction; and spiral striations are formed as dynamic-pressure-generating grooves in said thrust bearing portion, such that thrust load-bearing-pressure generated by said spiral striations acts in a radially inward direction.

8. A storage disk drive motor as set forth in claim 1, wherein a cover member is fitted on the upper-end opening of said cylindrical through-hole, and small pores are formed in the cover member for regulating pressure between said radial bearing portion and said thrust bearing portion, and the outside air.

9. A storage disk drive motor as set forth in claim 1, wherein a cover member is fitted on the upper-end opening of said cylindrical through-hole, and the cover member is formed from a pliant component to enable pressure regulation between said radial bearing portion and said thrust bearing portion, and the outside air.

10. A storage disk drive motor as set forth in claim 1, wherein said rotor magnet is secured underneath said disk-carrying flange and located radially inward of said stator.

11. A storage disk drive motor as set forth in claim 1, wherein the storage disk carried by said flange is one inch in outside diameter.

12. A mini storage disk drive motor configuration comprising:

a bracket having a central shaft-mounting hole surrounded by a rimmed boss;

a shaft fixedly fitted into the shaft-mounting hole;

a rotor hub peripherally carrying a rotor magnet, said rotor hub having an underside configuration for accommodation into the rimmed boss wherein a thrust bearing at a radially extending axial micro-gap is established between the underside of the rotor hub and the rimmed boss, and said rotor hub having a central through-hole for penetration by said shaft wherein a radial bearing at an axially extending radial micro-gap is established between the shaft circumferentially and the through-hole inner circumferentially, the thrust and radial bearings therein being contiguous; and a stator mounted on said bracket concentrically encompassing said rotor magnet at an axial and radial spacing; wherein lubricant is retained continuously in the axial and radial micro-gaps, fluid dynamic pressure-generating grooves are striated into the underside of said rotor hub wherein said rotor hub establishes the axial micro-gap, and striated into through-hole superficially wherein said rotor hub establishes the radial micro-gap, the fluid dynamic pressure-generating grooves being configured such that load-bearing pressure acting on the lubricant during rotation of the rotor hub is highest proximate where the thrust and radial bearings are contiguous, and magnetic centers of the rotor magnet and the stator are biased axially, whereby an energizing force is imparted to the rotor hub to balance the load-bearing pressure acting on the lubricant during rotation of the rotor hub into an equilibrium of rotation-stable rigidity.

\* \* \* \* \*